ELIAS F. VARNER, OF HARVEYSBURG, OHIO.

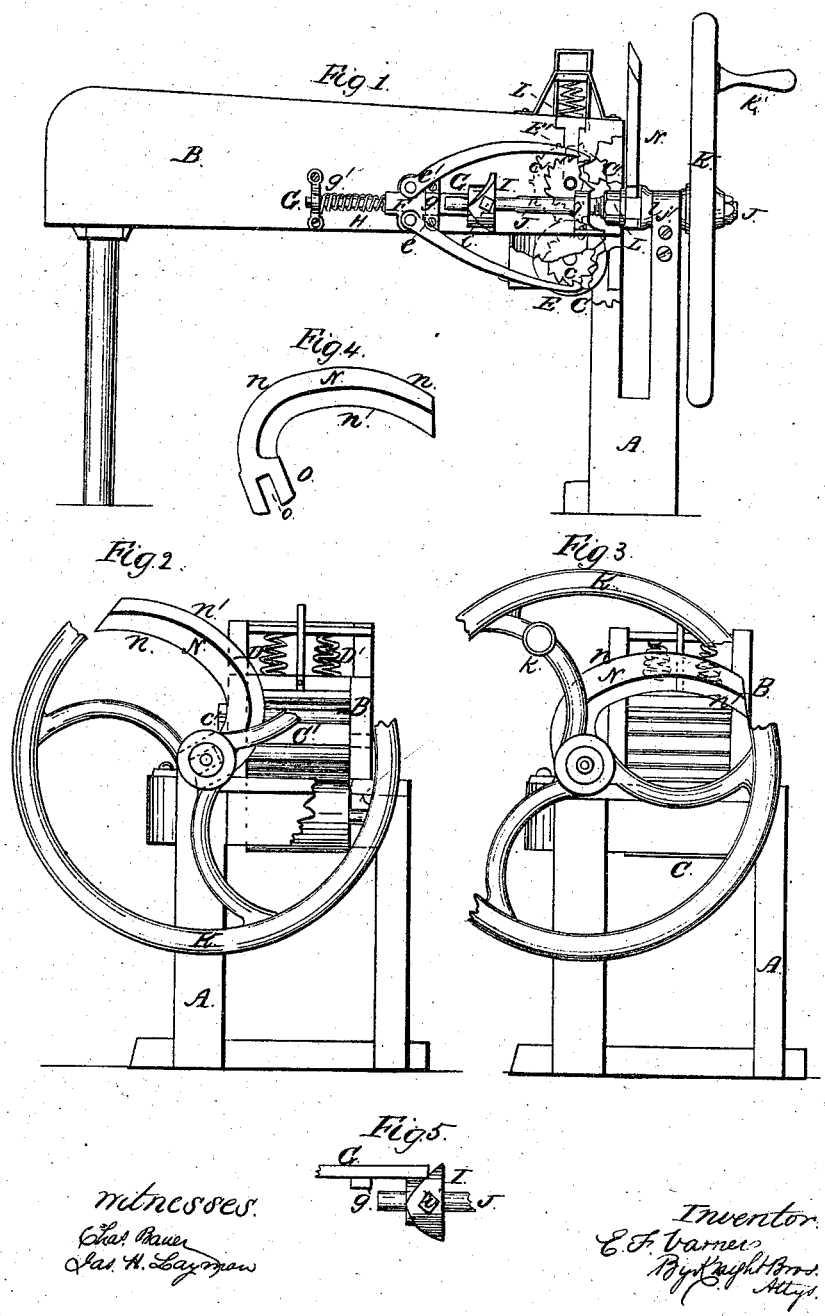

Letters Patent No. 83,571, dated October 27, 1868.

IMPROVEMENT IN FODDER-CUTTERS.

The Schedule referred to in these Letters Patent and making part of the same.

*To whom it may concern:*

Be it known that I, ELIAS F. VARNER, of Harveysburg, Warren county, Ohio, have invented certain new and useful Improvements in Fodder-Cutters; and I hereby declare the following to be a full, clear, and exact description thereof, reference being had to the accompanying drawings, making part of this specification.

My invention relates to that class of agricultural implements commonly known as fodder-cutters; and the first part of my improvements consists in making the knife of a cimeter-shape, and constructing it in such a manner that both the outer and inner edge can be sharpened; and by simply reversing the position of the knife so that either its hook or its cimeter-edge will operate, the machine will be rendered capable of cutting a great variety of materials.

In the accompanying drawings—

Figure 1 is a side elevation, partially in section, of my improved fodder-cutter.

Figures 2 and 3 are front elevations of the machine, showing the knife in its two different positions.

Figure 4 is a side elevation of the knife, detached.

Figure 5 is a view of the cam which operates the feed-movement.

A represents the frame, which supports a customary cutting-box, B, whose front end has journalled in it the feed-rollers C C', the upper one of which, C', is held in contact with the straw, or other material to be cut, by the springs D D.

Attached to the outer ends of the shafts of the feed-rollers C C' are ratchet-wheels $c$ $c'$, which are actuated by the feed-bands E E', the latter being pivoted, at $e$ $e'$, to a cross-head, F, which is attached to and reciprocates with a bar, G.

This bar is confined to a rectilinear path by the guides $g$ $g'$, which are bolted to the cutting-box B.

H is a spring, which forces the bar G towards the front end of the machine; and this bar is retracted by a cam, I, which is secured to the driving-shaft J by means of the set-screw $i$.

The driving-shaft J is journalled in bearings $j$ $j$, and its outer end carries the fly-wheel K, which is operated by a handle, $k$.

Secured to the driving-shaft J, by nut L and washer $l$, is the knife N, having an outer or cimeter-shaped cutting-edge, $n$, and an inner or hook-shaped cutting-edge, $n'$.

The knife has a shank, O, which is slotted at $o$, so as to permit its being fitted on to the driving-shaft J, and of being readily shipped and unshipped therefrom.

When it is desired to cut corn-stalks and other tough materials, the knife is attached to the shaft J, so that its cimeter-edge $n$ will operate, but when straw and similar light fodder are to be cut, the knife is reversed, by which means the hook-edge $n'$ is brought into action.

This reversal of the knife can be effected in a few minutes, by simply unslacking the nut L, so as to permit of the slotted shank O $o$ being disconnected with the shaft J, and, as soon as the position of the knife has been changed, it can be as readily attached to the shaft.

The provision of the adjustable cam I enables the operator to regulate the feed, so that the machine will cut the fodder either fine or coarse, as may be desired.

I claim herein as new, and of my invention—

1. The provision, in a fodder-cutter, of the knife N, having one cimeter cutting-edge, $n$, and one hooked cutting-edge, $n'$, and being furnished with a slotted shank, O $o$, or its equivalent, for attachment to a driving-shaft, in the manner herein described.

2. The combination and arrangement, substantially as described herein, of the feed-rollers C C', springs D, ratchet-wheels $c$ $c'$, pivoted feed-hands E E' $e$ $e'$, cross-head F, reciprocating bar G, spring H, adjustable cam I $i$, driving-shaft J, and fly-wheel K, for the object explained.

3. The combination of the knife N $n$ $n'$, driving-shaft J, nut L, and washer $l$, for the purpose described.

In testimony of which invention, I hereunto set my hand.

ELIAS F. VARNER.

Witnesses:
GEO. H. KNIGHT,
JAMES H. LAYMAN.